United States Patent [19]
Hunter

[11] 3,844,660
[45] Oct. 29, 1974

[54] METHOD AND APPARATUS FOR ALIGNING AN INTERFEROMETER MIRROR

[75] Inventor: George C. Hunter, Middletown, Conn.

[73] Assignee: Zygo Corporation, Middletown, Conn.

[22] Filed: Nov. 16, 1972

[21] Appl. No.: 307,162

[52] U.S. Cl. .................. 356/106, 356/110, 356/153
[51] Int. Cl. ............................................. G01b 9/02
[58] Field of Search .......... 356/138, 139, 140, 142, 356/153, 154, 247, 106–113

[56] References Cited
UNITED STATES PATENTS
3,528,748   10/1970   Burch et al. ........................ 356/153

OTHER PUBLICATIONS
"Metrology with Autocollimators;" Hume, 1965, pp. 11,12.

Primary Examiner—Ronald L. Wibert
Assistant Examiner—Conrad Clark
Attorney, Agent, or Firm—Milton Zucker

[57] ABSTRACT

A method and apparatus for aligning an interferometer mirror orthogonal to an incident collimated light beam is described. A retroreflector is placed in the collimated beam before the mirror so that a reference beam is obtained to which the light reflected by the interferometer mirror can be aligned on the view screen of the interferometer. Once adjustment has been achieved, the retroreflector can be removed.

4 Claims, 2 Drawing Figures

PATENTED OCT 29 1974 3,844,660

3,844,660

METHOD AND APPARATUS FOR ALIGNING AN INTERFEROMETER MIRROR

BACKGROUND OF THE INVENTION

1. Field of the Invention

The present invention relates to a method and apparatus for the alignment of an optical interferometer mirror. More particularly, the invention relates to the use of an optical element, a retroreflector, for achieving this type of alignment.

2. The Prior Art

Interferometers of the Fizeau or Fabry-Perot type are widely used for optical measurements. In these devices, a beam of light is passed through a first lens and a beam splitter, through a second lens which produces a collimated beam of expanded diameter, which then goes to a partially reflecting mirror; the part of the light passing through the mirror is then passed onto the test object; the reflected light from the test object and the mirror return to the beam splitter and are reflected onto a viewing screen which is ordinarily parallel to the axis of the beam of light. It is essential that the partially reflecting mirror in these devices be accurately aligned orthogonal to the incident light beam, to extremely fine angular tolerances; tolerances to a small fraction of an arc second are commonly required.

Prior-art methods for aligning these mirrors are based on autocollimation techniques where the focus of the reflected light is made coincident with the point source of light located at the focus of the first lens. While this method can be carried out in a variety of ways, the method generally used is based on placing a pinhole at the focus of the first lens. The autocollimated reflection off the interferometer mirror produces a spot of light focused in the plane of the pinhole. By adjusting the angular orientation of the mirror, the autocollimated spot can be made to coincide with the point source of light. Auxiliary equipment, such as a telescope, is often used to aid in the orientation of the mirror.

The method suffers from a variety of difficulties. Firstly, the point source of light at the focus is usually much brighter than the autocollimated spot reflected from the mirror so that bringing the two into coincidence at the pinhole is usually very difficult. Secondly, the use of auxiliary equipment like a telescope is both costly and impractical in many configurations.

OBJECT OF THE INVENTION

It is the principal object of this invention to provide an improved method for aligning optical interferometer mirrors.

STATEMENT OF THE INVENTION

In accordance with the instant invention, I make my adjustment of the partially reflecting mirror in an interferometer of the type described above on the viewing screen rather than on a plate with a pinhole at the focus of the first lens, by inserting a retroreflector (also known as a cube corner) between the second lens and the mirror, to produce a reference point on the viewer to which the beam reflected from the mirror can be moved by adjustment of the mirror. Desirably, but not essentially, I adjust the amount of light returning from the retroreflector and the mirror so that the spots are not in great contrast to one another. The retroreflector may be removed, if desired, from the optical path after adjustment.

THE DRAWINGS

DETAILED DESCRIPTION OF THE INVENTION

Figure 1:
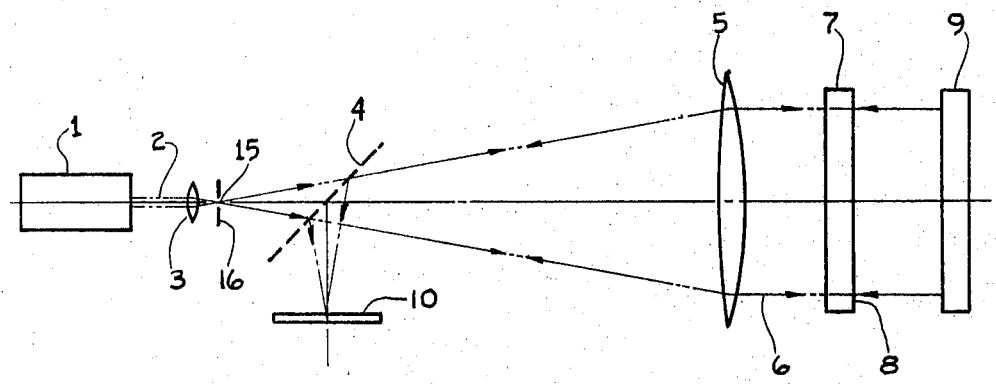
FIG. 1 is a schematic of a Fizeau interferometer, with the mirror in correct position.

Description and Explanation of the Schematic in FIG. 1

FIG. 1 shows the layout of a typical Fizeau interferometer. A light source such as a tungsten bulb, xenon bulb, light-emitting diode, laser diode, or other source of radiant energy, and most preferably a gas laser 1 provides optical energy. The output laser beam 2 is focused by lens 3 to a point 15 and the resultant diverging spherical wave front is recollimated at an expanded beam diameter by lens 5. The expanded collimated beam 6 is used by the optical cavity formed by the semireflecting mirror 7 and the test surface 9. A beam splitter 4, preferably a pellicle type, directs a part of the autocollimated light onto the view screen 10. In essence, the spot of light on the view screen is the image of the point source 15 formed at the focus of lens 3. The position of the autocollimated light spot on the view screen, i.e., the image of the point source, is a function of the angular orientation of the reflecting surface 8 of mirror 7. The reflecting surface 8 of mirror 7 can be made perpendicular to the collimated beam 6 by orienting the angular position of mirror 7 such that the image of the point source 15, produced by the light transmitted by the beam splitter 4, coincides with the point source 15.

This is ordinarily done by placing a screen 16 with a pinhole at the focus of lens 3 to provide a means of viewing the location of the image. However, the brightness of the point source 15 makes it very difficult to effect repeatable, accurate alignment.

Figure 2:
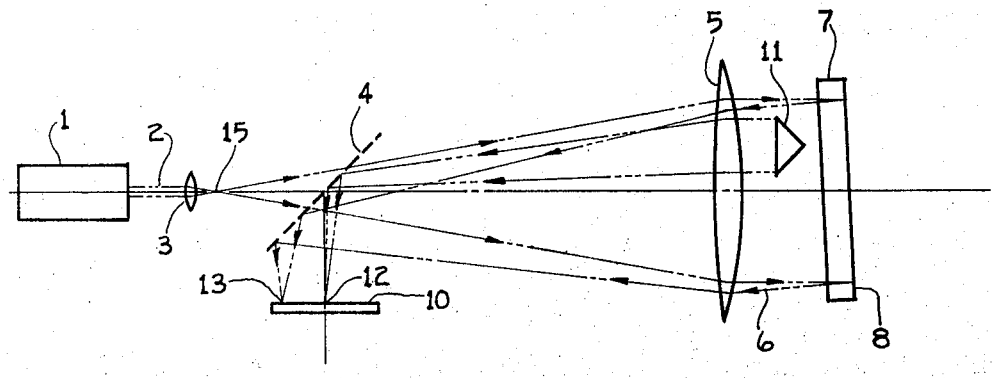
FIG. 2 is a schematic of a Fizeau interferometer with an alignment retroreflector showing the preferred embodiment of the invention, with the mirror out of line.

Description and Explanation of the Schematic in FIG. 2

Referring to FIG. 2, there is here illustrated the apparatus for the embodiment of this invention.

Instead of using the screen 16 at the focal point 15 of the lens 3, a retroreflector 11 is inserted in the collimated beam 6 in front of the mirror 7. This device (also known as a cube corner) is a trihedral prism with the property that the reflected light ray is reflected exactly parallel to the incident ray with its direction of motion exactly opposite to that of the incident ray, independent of the angular orientation of the trihedral prism.

Therefore, an image 12 of the point source 15 is formed on the view screen 10 which is independent of the orientation of the prism 11 or of the mirror 7. If now the spot 13 formed on the view screen 10 by the light autocollimated by the reflecting surface 8 of mirror 7 is made to coincide with the spot 12, the alignment of surface 8 perpendicular to the collimated beam 6 has been effected. This can be done by adjusting the angle of the mirror 7. When the spots 12 and 13 coincide, the device can be used with a test object 9; if desired, the retroreflector can be removed from the optical path.

It is often desirable to have the spots 12 and 13 of about equal intensity. This can be accomplished in several ways.

Depending on the desired results, the mirror 7 is selected to reflect from about 5 to 95 percent of the incident light; the retroreflector 11 reflects substantially all of the light. The spots 12 and 13 are of about equal intensity where the mirror 7 reflects only a small part of the incident light.

Where the mirror 7 is highly reflective, an opaque mask can be inserted between it and the lens 5 to reduce its effective area; this reduces the intensity of the spot 13 in proportion to the reduction in effective area.

The embodiment of the invention illustrated can obviously be modified without departing from the scope of the invention as defined in the claims.

What is claimed is:

1. The method of aligning an interferometer comprising a light source, a first lens which focuses the light and a second lens which collimates the light into a beam which falls onto an adjustable partially reflecting mirror which can be adjusted to be orthogonal to said beam, and a beam splitter between the two lenses in the optical path formed by said light source, said lenses and said mirror, which beam splitter directs light reflected from said mirror onto a viewing screen out of said optical path, in which said mirror must be adjusted exactly orthogonal to the collimated beam to align the interferometer, which method comprises interrupting a portion of said beam between said second lens and said mirror and retroreflecting the interrupted portion of the beam exactly parallel to its incidence, thereby providing a spot of light on said viewing screen at the exact position where the reflected light from said mirror would focus if said mirror were exactly orthogonal to said beam, and adjusting the angle of said mirror so that the spot of light reflected from said mirror onto said screen coincides with the spot from the reflected interrupted beam.

2. The method of claim 1, in which the amounts of light reflected onto the screen from the —interrupted beam— and mirror are adjusted so that they approximate each other in intensity.

3. In an interferometer apparatus comprising a light source, a first lens which focuses and expands the light, a second lens which collimates the light into a collimated beam, a partially reflecting mirror which receives said collimated beam and reflects a portion of said beam back into the apparatus, said mirror being adjustable into a position orthogonal to said beam, a beam splitter between said lenses in the optical path formed by said light source, said lenses and said mirror, which beam splitter directs said reflected beam onto a viewing screen out of said optical path, the improvement which comprises a cube corner retroreflector in said optical path between said second lens and said mirror which reflects a spot of light onto the viewing screen at exactly the point on the viewing screen where light from said mirror falls when said mirror is orthogonal to said collimated beam.

4. The apparatus of claim 3, in which the light source is a laser.

* * * * *